(12) United States Patent
Uchikawa et al.

(10) Patent No.: US 8,545,802 B2
(45) Date of Patent: Oct. 1, 2013

(54) PROCESS FOR PRODUCTION OF DDR-TYPE ZEOLITE

(75) Inventors: Tetsuya Uchikawa, Nagoya (JP); Kenji Yajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/457,838

(22) Filed: Apr. 27, 2012

(65) Prior Publication Data

US 2012/0213696 A1 Aug. 23, 2012

Related U.S. Application Data

(63) Continuation of application No. PCT/JP2010/069726, filed on Nov. 5, 2010.

(30) Foreign Application Priority Data

Dec. 10, 2009 (JP) .................................. 2009-280294

(51) Int. Cl.
*C01B 33/36* (2006.01)
*C01B 39/00* (2006.01)
*C01F 7/00* (2006.01)

(52) U.S. Cl.
USPC ............ 423/700; 423/705; 423/702; 423/709

(58) Field of Classification Search
None
See application file for complete search history.

(56) References Cited

U.S. PATENT DOCUMENTS

| | | | |
|---|---|---|---|
| 6,953,493 B2 | 10/2005 | Nakayama et al. | |
| 7,014,680 B2 | 3/2006 | Nakayama et al. | |
| 2009/0011926 A1* | 1/2009 | Yajima et al. | 502/62 |

FOREIGN PATENT DOCUMENTS

| | | |
|---|---|---|
| EP | 0 255 770 A2 | 2/1988 |
| JP | 63-040718 A1 | 2/1988 |
| JP | 2003-159518 A1 | 6/2003 |
| JP | 2004 083375 * | 3/2004 |
| JP | 2004-083375 A1 | 3/2004 |
| JP | 2005-067991 A1 | 3/2005 |

OTHER PUBLICATIONS

Exter et al, "Separation of Permanent Gases on the All-Silica a-Ring Clathrasil. DD3R", Zeolites and Related Microporous Materials: State of the Art 1994, 1159-1166.*

M.J. den Exter et al., "*Separation of Permanent Gases on the All-Silica 8-Ring Clathrasil DD3R,*" Studies in Surface Science and Catalysis, 1994, vol. 84, pp. 1159-1166.

International Search Report and Written Opinion dated Dec. 28, 2010.

* cited by examiner

*Primary Examiner* — Bijay Saha
(74) *Attorney, Agent, or Firm* — Burr & Brown

(57) ABSTRACT

There is provided a process for producing a DDR-type zeolite having: a raw material solution preparation step of preparing a raw material solution containing 1-adamantaneamine hydrochloride, silica ($SiO_2$), and water at a 1-adamantaneamine hydrochloride/$SiO_2$ molar ratio of 0.002 to 0.5 and a water/$SiO_2$ molar ratio of 10 to 500, and a crystal growth step of subjecting the raw material solution and a DDR-type zeolite powder to a heat treatment in a state that both the raw material solution and the DDR-type zeolite powder are brought into contact with each other to grow crystals of the DDR-type zeolite by the use of the DDR-type zeolite powder as seed crystals.

6 Claims, 2 Drawing Sheets

PROCESS FOR PRODUCTION OF DDR-TYPE ZEOLITE

FIELD OF THE INVENTION

The present invention relates to a process for producing a DDR-type zeolite usable for a catalyst, a catalyst carrier, an adsorber, a gas separation membrane, a pervaporation membrane, and the like.

BACKGROUND OF THE INVENTION

There are many kinds (types) of zeolites called LTA, MFI, MOR, AFI, FER, FAU, and DDR classified by the crystal structures.

Of these, DDR (Deca-Dodecasil 3R) is a crystal having silica as the main component and having pores by a polyhedron containing an oxygen-containing eight-membered ring in the crystal structure. The pore size of the DDR-type zeolite is 4.4×3.6 angstrom, which is relatively small among pore sizes of various zeolites.

The DDR-type zeolite has an inherent adsorption property with respect to low molecular gas in addition to a small pore size. Therefore, the DDR-type zeolite is used as an adsorber for separating only a specific low molecular gas. For example, the DDR-type zeolite can be used as a molecular sieve membrane for low molecular gas.

As a process for producing a DDR-type zeolite, there is known a process of growing crystals of the DDR-type zeolite by using 1-adamantaneamine as a structure-defining agent, using colloidal silica, ethylenediamine, and water as the raw materials, and adding DDR-type zeolite seed crystals to the raw materials for hydrothermal synthesis. In this production process, there can be produced an all silica DDR-type zeolite not containing aluminum (Patent Documents 1 and 2).

PRIOR ART DOCUMENTS

Patent Document

Patent Document 1: JP-A-2004-83375
Patent Document 2: JP-A-2005-67991

However, in a conventional process for producing a DDR-type zeolite, along time is required for hydrothermal synthesis, and it is necessary to continuously agitate the raw material solution during the hydrothermal synthesis in order to produce a single crystal of DDR-type zeolite.

In addition, in a conventional process for producing a DDR-type zeolite, since 1-adamantaneamine is poorly-soluble in water, the conditions of hydrothermal synthesis are improved by dissolving 1-adamantaneamine in ethylenediamine. However, since ethylenediamine is a target substance of the PRTR system [Pollutant Release and Transfer Register System of notification of discharge amount of a chemical substance which is likely to be harmful to human health or biogeocenosis to an environment (air, water, soil) and aggregation and publication of the discharge amount of the chemical substance by the government], there is desired a process for producing a DDR-type zeolite, where ethylenediamine does not have to be used, in order to reduce the influence on the environment.

Further, there is a demand of producing a DDR-type zeolite at low costs.

In view of the aforementioned problems, the present invention aims to provide a DDR-type zeolite production process capable of conducting the process with materials that affect environments to a less extent, requiring a shorter hydrothermal synthesis time, not requiring continuous agitation of the raw material solution, and requiring low production costs.

SUMMARY OF THE INVENTION

In order to solve the aforementioned problems, the present inventors found out a synthesis method of a DDR-type zeolite using 1-adamantaneamine hydrochloride, which has led to the completion of the present invention. That is, according to the present invention, there is provided a process for producing a DDR-type zeolite shown below.

According to a first aspect of the present invention, a process for producing a DDR-type zeolite is provided, comprising: a raw material solution preparation step of preparing a raw material solution containing 1-adamantaneamine hydrochloride, silica ($SiO_2$), and water at a 1-adamantaneamine hydrochloride/$SiO_2$ molar ratio of 0.002 to 0.5 and a water/$SiO_2$ molar ratio of 10 to 500, and a crystal growth step of subjecting the raw material solution and a DDR-type zeolite powder to a heat treatment in a state that both the raw material solution and the DDR-type zeolite powder are brought into contact with each other to grow crystals of the DDR-type zeolite by the use of the DDR-type zeolite powder as seed crystals.

According to a second aspect of the present invention, the process for producing a DDR-type zeolite according to the first aspect is provided, wherein the raw material solution does not contain ethylenediamine.

According to a third aspect of the present invention, the process for producing a DDR-type zeolite according to first or second aspects is provided, wherein the raw material solution preparation step includes a step of preparing the raw material solution containing the silica ($SiO_2$) by the use of silica sol and a pH adjustment step of adjusting pH of the raw material solution.

According to a fourth aspect of the present invention, the process for producing a DDR-type zeolite according to any one of first to third aspects is provided, wherein, in the raw material solution preparation step, the raw material solution containing sodium hydroxide (NaOH) at a NaOH/1-adamantaneamine hydrochloride molar ratio of 1.0 or less is prepared by allowing the silica ($SiO_2$) to be contained by the use of silica sol.

According to a fifth aspect of the present invention, the process for producing a DDR-type zeolite according to any one of first to fourth aspects is provided, wherein, in the crystal growth step, the DDR-type zeolite powder is dispersed in the raw material solution to bring the raw material solution and the DDR-type zeolite powder into contact with each other.

According to a sixth aspect of the present invention, the process for producing a DDR-type zeolite according to any one of first to fifth aspects is provided, wherein, in the crystal growth step, a support is immersed in the raw material solution where the DDR-type zeolite powder is dispersed to grow crystals of the DDR-type zeolite on the support.

According to a seventh aspect of the present invention, the process for producing a DDR-type zeolite according to any one of first to fourth aspects is provided, wherein, in the crystal growth step, a support where the DDR-type zeolite powder is adhering is immersed in the raw material solution to bring the raw material solution and the DDR-type zeolite powder into contact with each other.

A process for producing a DDR-type zeolite of the present invention requires a shorter hydrothermal synthesis time and does not require continuous agitation of the raw material solution. In addition, a process for producing a DDR-type zeolite of the present invention can be conducted even without using ethylenediamine, which is pointed out as affecting the environments. Further, since 1-adamantaneamine hydrochloride, which is widely available and inexpensive, is used in a process for producing a DDR-type zeolite of the present invention, the production costs can be made low.

DETAILED DESCRIPTION OF THE INVENTION

Figure 1:
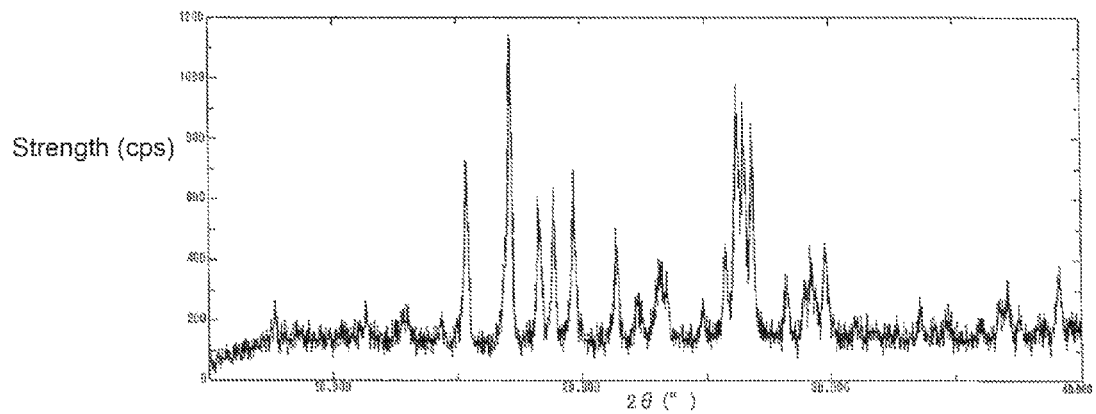
FIG. 1 is a graph showing an X-ray diffraction pattern of a powdered DDR-type zeolite of Example 1.

Hereinbelow, embodiments of the present invention will be described with referring to drawings. The present invention is by no means limited to the following embodiments, and changes, modifications, and improvements may suitably be added as long as they do not deviate from the scope of the present invention.

1. Summary of Process for Producing DDR-Type Zeolite of the Present Invention:

A process for producing a DDR-type zeolite of the present invention has a raw material solution preparation step of preparing a raw material solution containing 1-adamantaneamine hydrochloride, silica ($SiO_2$), and water and a crystal growth step of subjecting the raw material solution and a DDR-type zeolite powder to a heat treatment in a state that both the raw material solution and the DDR-type zeolite powder are brought into contact with each other to grow crystals of the DDR-type zeolite. The aforementioned raw material solution contains 1-adamantaneamine hydrochloride, $SiO_2$, and water, where the 1-adamantaneamine hydrochloride/$SiO_2$ molar ratio is 0.002 to 0.5 and where the water/$SiO_2$ molar ratio is 10 to 500.

1-adamantaneamine serves as a substance to become a template for forming a crystal structure of the DDR-type zeolite when crystals of DDR-type zeolite grow, so-called structure-defining agent. However, 1-adamantaneamine is poorly-soluble in water. Therefore, in a process for producing a DDR-type zeolite of the present invention, 1-adamantaneamine hydrochloride is used since it has high solubility in the raw material solution. 1-adamantaneamine can function as a structure-defining agent in the crystal growth of the DDR-type zeolite even when it is dissolved in a raw material solution in the form of hydrochloride.

Therefore, in a process for producing a DDR-type zeolite of the present invention, 1-adamantaneamine hydrochloride is used instead of 1-adamantaneamine, and thereby a sufficient amount of the structure-defining agent can be dissolved in a raw material solution.

In a process for producing a DDR-type zeolite of the present invention, since a sufficient amount of the structure-defining agent is dissolved in the raw material solution, crystal growth of the DDR-type zeolite proceeds efficiently in the crystal growth step. As a result, zeolite crystals are produced in a state of very little multiphase with crystal phases other than DDR-type.

1-1. Raw Material Preparation Step:

In the raw material preparation step, there is prepared a raw material solution containing 1-adamantaneamine hydrochloride, silica ($SiO_2$), and water.

In this step, the raw material solution is prepared in such a manner that the molar ratio of 1-adamantaneamine hydrochloride/$SiO_2$ is 0.002 to 0.5. Since the molar ratio of 1-adamantaneamine hydrochloride/$SiO_2$ is 0.002 or more, the amount of the structure-defining agent dissolved in the raw material solution does not become insufficient, and, as a result, the crystal growth rate of the DDR-type zeolite does not fall. On the other hand, when the 1-adamantaneamine hydrochloride/$SiO_2$ molar ratio is 0.5, the amount of 1-adamantaneamine hydrochloride is sufficient for maintaining the crystal growth rate of the DDR-type zeolite. Therefore, when the 1-adamantaneamine hydrochloride/$SiO_2$ molar ratio is 0.5 or less, the amount of the 1-adamantaneamine hydrochloride used can be maintained at a minimum necessary level, and thereby 1-adamantaneamine hydrochloride can be saved, which is preferable from the viewpoint of production costs.

In this step, the raw material solution is prepared in such a manner that the molar ratio of water/$SiO_2$ is 10 to 500. This numerical range is suitable for crystal growth of the DDR-type zeolite.

In the raw material solution preparation step, it is possible to allow the raw material solution to contain silica ($SiO_2$) by using silica sol as a raw material. As the silica sol, there may be used silica sol prepared by dissolving minute powder-type silica in water or commercially available colloidal silica.

The silica sol tends to gelate when pH is too high and when pH is too low. In the case of preparing the raw material solution by using silica sol, it is preferable that the raw material solution preparation step has a pH adjustment step of adjusting pH of the raw material solution lest the silica sol should gelate.

A specific example of the pH adjustment step is addition of a hydroxide solution.

It is preferable to prepare a raw material solution so as to contain sodium hydroxide (NaOH) at a NaOH/1-adamantaneamine hydrochloride molar ratio of 1.0 or less by the aforementioned pH adjustment step or the like. This inhibits the raw material solution from having an excessively high pH condition or an excessively low pH condition, and, as a result, the tendency of gelation of the raw material solution becomes very low.

In the raw material solution preparation step, it is also possible to disperse a DDR-type zeolite powder to function as seed crystals in the raw material solution in advance.

In a process for producing a DDR-type zeolite of the present invention, there is used 1-adamantaneamine hydrochloride, which is easily dissolved in water. Therefore, a process for producing a DDR-type zeolite of the present invention can be conducted even without using an additive (e.g., ethylenediamine) for dissolving 1-adamantaneamine in the raw material solution.

1-2. Crystal Growth Step:

In the crystal growth step, crystals of the DDR-type zeolite is grown with a DDR-type zeolite powder as seed crystals by hydrothermal synthesis where a heat treatment is performed in a state that both the raw material solution and a DDR-type zeolite powder are brought into contact with each other.

In the hydrothermal synthesis, the temperature of the raw material solution is generally 100 to 170° C., preferably 120 to 170° C. from the viewpoint of raising the crystal growth rate.

In addition, the time of hydrothermal synthesis is generally 8 to 120 hours, preferably 12 to 24 hours from the viewpoint of reducing production costs.

A process for producing a DDR-type zeolite of the present invention can employ the following embodiment with having the aforementioned characteristics.

2. Embodiment where the Raw Material Solution Does not Contain Ethylenediamine:

In a process for producing a DDR-type zeolite of the present invention, it is not necessary to use ethylenediamine in order to dissolve 1-adamantaneamine in the raw material solution since 1-adamantaneamine is dissolved in a raw material solution in the form of hydrochloride, which is easily dissolved in water. Therefore, in a process for producing a DDR-type zeolite of the present invention, an embodiment where the raw material solution does not contain ethylenediamine can be employed.

Since this embodiment does not use ethylenediamine, which is a target substance of the PRTR system, the influence on the environments is less.

3. Embodiment where a DDR-Type Zeolite Powder is Disposed in Raw Material Solution:

The crystal growth step can be conducted by dispersing a DDR-type zeolite powder serving as seed crystals in the raw material solution. In this embodiment, as a result of the crystal growth, a powdery DDR-type zeolite can be produced.

In addition, in the crystal growth step, crystals of a DDR-type zeolite can be grown on the support by immersing a support in a raw material solution where a DDR-type zeolite powder is dispersed. In this embodiment, a support where DDR-type zeolite crystal grains adhere can be produced.

Further, in this embodiment, the DDR-type zeolite powder may be adhering or does not have to be adhering to the support before the immersion in the raw material solution.

4. Embodiment Employing a Support Having a DDR-Type Zeolite Powder Adhering Thereto:

The crystal growth step may be conducted by immersing a support having a DDR-type zeolite powder adhering thereto in the raw material solution. In this embodiment, as a result of crystal growth, a DDR-type zeolite membrane is formed on the support. In addition, in this embodiment, the raw material solution may contain or does not have to contain the DDR-type zeolite powder.

EXAMPLE

Hereinbelow, the present invention will be described in more detail on the basis of Examples. However, the present invention is by not means limited to these Examples.

Examples 1 and 2

(Raw Material Solution Preparation Step)

Water and 0.81 g of 1-adamantaneamine hydrochloride (produced by Idemitsu Kosan, Co., Ltd.) were put in a 100 ml fluororesin jar and mixed together to prepare a 1-adamantaneamine hydrochloride aqueous solution. At that time, the 1-adamantaneamine hydrochloride was agitated by the use of a stirrer to completely dissolve it in water. To the 1-adamantaneamine hydrochloride aqueous solution was added 10 mass % sodium hydroxide aqueous solution, and it was agitated with a stirrer. Subsequently, to the solution was added silica sol (trade name: Snowtex S, produced by Nissan Chemical Industries, Ltd., with solid content concentration of 30 mass %), and it was agitated by the use of a shaker to obtain a raw material solution. The 1-adamantaneamine hydrochloride/$SiO_2$ molar ratio and the water/$SiO_2$ molar ratio in the raw material solution in Examples 1 and 2 and the NaOH/1-adamantaneamine hydrochloride molar ratio in the raw material solution are shown in Table 1.

TABLE 1

|  | Example 1 | Example 2 | Example 3 |
|---|---|---|---|
| 1-adamantaneamine hydrochloride/$SiO_2$ | 0.0268 | 0.0268 | 0.0268 |
| Water/$SiO_2$ | 24.0 | 24.0 | 24.0 |
| NaOH/1-adamantaneamine hydrochloride | 1.0 | 0.5 | 0 |

(Crystal Growth Step)

A DDR-type zeolite powder composed of particle having a particle diameter of 5 μm or less was dispersed in water at a solid content concentration of 0.34 mass % to prepare a DDR-type zeolite seed crystal dispersion solution. To the raw material solution in the jar was added 0.8 g of the DDR-type zeolite seed crystal dispersion solution, and it was slightly agitated. Then, the raw material solution was transferred to a stainless-steel pressure resistant container having a fluororesin internal cylinder having a capacity of 100 ml and subjected to hydrothermal synthesis at 160° C. for 16 hours. During the hydrothermal synthesis, the solution was not agitated. After the hydrothermal synthesis, a white synthesized powder was deposited at the bottom of the fluororesin internal cylinder. The synthesized powder was collected from the bottom of the fluororesin internal cylinder. The collected synthesized powder was washed with water and then dried at 80° C. Thus, a powdery DDR-type zeolite was obtained. Hereinbelow, the powdery DDR-type zeolite obtained in Example 1 will be referred to as a powdery DDR-type zeolite of Example 1. Also, regarding Example 2, the powdery DDR-type zeolite obtained will be referred to in a similar manner.

(Evaluation of Crystal Phase)

Figure 2:
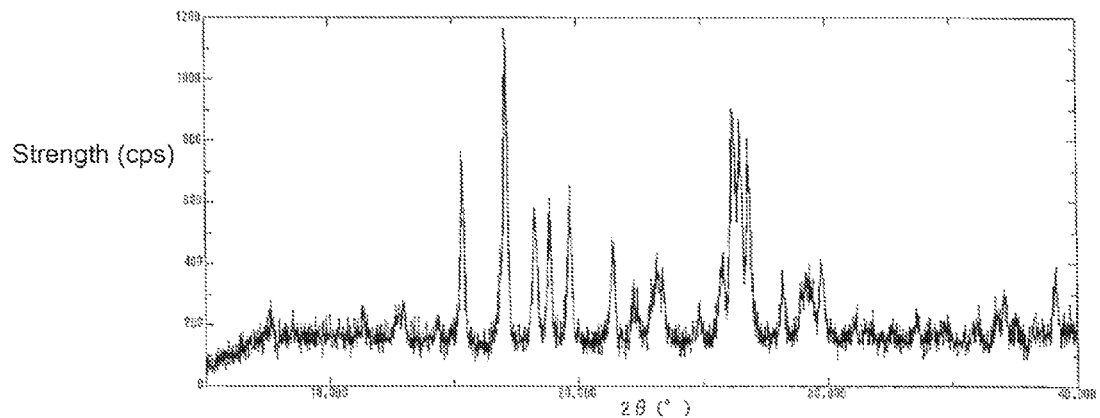
FIG. 2 is a graph showing an X-ray diffraction pattern of a powdered DDR-type zeolite of Example 2.

Regarding the powdery DDR-type zeolites of Examples 1 and 2, the crystal phases were evaluated by X-ray diffraction. As a result, only the diffraction peak of each of the DDR-type zeolites was clearly detected, and no halo was recognized in the region of 2θ=20 to 30° (CuKα). Therefore, it was confirmed that a DDR-type zeolite perfect crystal was obtained in Examples 1 and 2. The graph shown in FIG. 1 shows the result of X-ray analysis where the powdery DDR-type zeolite of Example 1 was measured by the use of an X-ray diffractometer (Name: MiniFlex produced by Rigaku Corporation). Likewise, the graph shown in FIG. 2 shows the result of X-ray analysis of the powdery DDR-type zeolite of Example 2. Incidentally, the "diffraction peak of the DDR-type zeolite" in the X-ray diffraction means the diffraction peak described in No. 38-651 or No. 41-571 corresponding to Deca-dodecasil 3R shown in the "Powder Diffraction File" by the International Center for Diffraction Data (ICDD).

Example 3

(Raw Material Solution Preparation Step)

In a 100 ml fluororesin jar were put 61 ml of water and 0.71 g of 1-adamantaneamine hydrochloride (produced by Daicel Corporation) to prepare 1-adamantaneamine hydrochloride aqueous solution. At that time, 1-adamantaneamine hydrochloride was agitated with a stirrer to be completely dissolved in water. To the 1-adamantaneamine hydrochloride aqueous solution was added silica sol (Trade name: Snowtex S, produced by Nissan Chemical Industries, Ltd., with solid content concentration of 30 mass %). Then, the solution was agitated by the use of a shaker to obtain a raw material solution. The 1-adamantaneamine hydrochloride/$SiO_2$ molar ratio and the water/$SiO_2$ molar ratio in the raw material solution of Example 3 are shown in Table 1.

(Crystal Growth Step)

To the raw material solution in the jar was added 0.3 g of the DDR-type zeolite seed crystal dispersion solution which was the same as in Examples 1 and 2, and it was slightly agitated. Then, the raw material solution was transferred to a stainless-steel pressure resistant container having a fluororesin internal cylinder having a capacity of 100 ml. An alumina porous support was immersed in the raw material solution, and hydrothermal synthesis was performed at 135° C. for 120 hours. During the hydrothermal synthesis, the solution was not agitated. After the hydrothermal synthesis, the alumina support was taken out from the fluororesin internal cylinder. The alumina support was washed with water and then dried at 80° C. Hereinbelow, the alumina support obtained in Example 3 as described above will be referred to as an alumina support after hydrothermal synthesis of Example 3.

(Microstructure Observation)

Regarding the alumina support after hydrothermal synthesis of Example 3, the microstructure observation was conducted by the use of a scanning electron microscope (hereinbelow SEM). As a result, it was confirmed that a large number of crystal grains were adhering to the alumina support after hydrothermal synthesis of Example 3.

(Evaluation of Crystal Phase)

Figure 3:
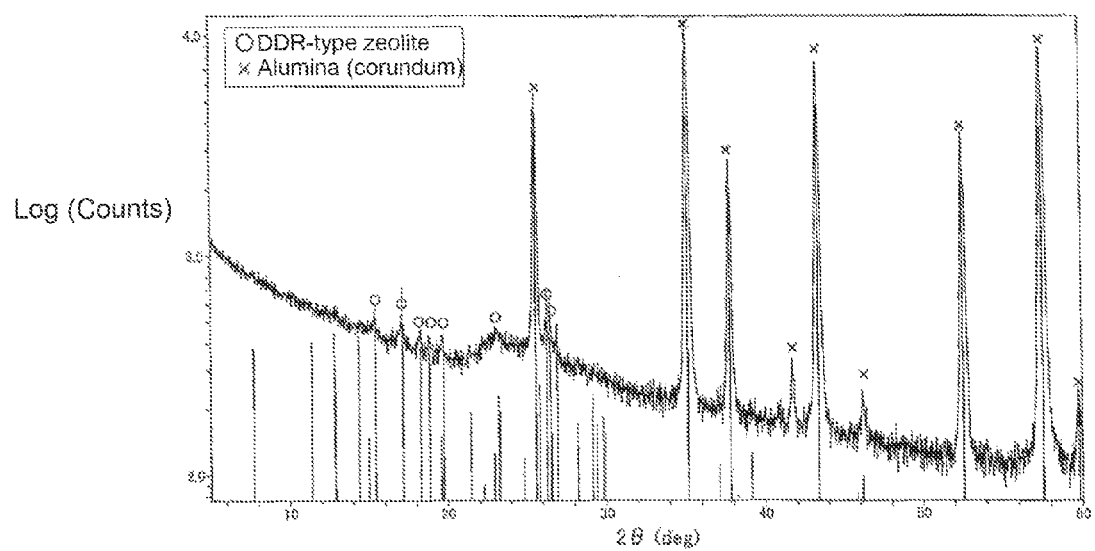
FIG. 3 is a graph showing an X-ray diffraction pattern of an alumina support after hydrothermal synthesis of Example 3.

Regarding the alumina support after hydrothermal synthesis of Example 3, evaluation of the crystal phase was conducted by X-ray diffraction. The graph shown in FIG. 3 shows a result of X-ray analysis where the alumina support after hydrothermal synthesis of Example 3 was measured by the use of an X-ray diffractometer. As a result, diffraction peaks (peaks shown by crosses (x) in FIG. 3) of alumina (corundum) as a component of the support, diffraction peaks (peaks shown by circles (O) in FIG. 3) of the DDR-type zeolite, and halo were detected. Therefore, it was confirmed that DDR-type zeolite crystals were formed on the alumina support after hydrothermal synthesis of Example 3. In addition, in Example 3, DDR-type zeolite crystals were grown even with the raw material solution containing no sodium hydroxide (NaOH).

INDUSTRIAL APPLICABILITY

The present invention can be used as a process for producing a DDR-type zeolite usable for a catalyst, a catalyst carrier, an adsorber, a gas separation membrane, a pervaporation membrane, and the like.

The invention claimed is:

1. A process for producing a DDR-type zeolite comprising:
   a raw material solution preparation step of preparing a raw material solution containing 1-adamantaneamine hydrochloride, silica ($SiO_2$), and water at a 1-adamantaneamine hydrochloride/$SiO_2$ molar ratio of 0.002 to 0.5 and a water/$SiO_2$ molar ratio of 10 to 500, wherein the raw material solution does not contain ethylenediamine: and
   a crystal growth step of subjecting the raw material solution and a DDR-type zeolite powder to a heat treatment in a state that both the raw material solution and the DDR-type zeolite powder are brought into contact with each other to grow crystals of the DDR-type zeolite by the use of the DDR-type zeolite powder as seed crystals.

2. The process for producing a DDR-type zeolite according to claim 1, wherein the raw material solution preparation step includes a step of preparing the raw material solution containing the silica ($SiO_2$) by the use of silica sol and a pH adjustment step of adjusting pH of the raw material solution.

3. The process for producing a DDR-type zeolite according to claim 1, wherein, in the raw material solution preparation step, the raw material solution containing sodium hydroxide (NaOH) at a NaOH/1-adamantaneamine hydrochloride molar ratio of 1.0 or less is prepared by allowing the silica ($SiO_2$) to be contained by the use of silica sol.

4. The process for producing a DDR-type zeolite according to claim 1, wherein, in the crystal growth step, the DDR-type zeolite powder is dispersed in the raw material solution to bring the raw material solution and the DDR-type zeolite powder into contact with each other.

5. The process for producing a DDR-type zeolite according to claim 1, wherein, in the crystal growth step, a support is immersed in the raw material solution where the DDR-type zeolite powder is dispersed to grow crystals of the DDR-type zeolite on the support.

6. The process for producing a DDR-type zeolite according to claim 1, wherein, in the crystal growth step, a support where the DDR-type zeolite powder is adhering is immersed in the raw material solution to bring the raw material solution and the DDR-type zeolite powder into contact with each other.

* * * * *